United States Patent
Williams et al.

(10) Patent No.: US 6,781,962 B1
(45) Date of Patent: Aug. 24, 2004

(54) APPARATUS AND METHOD FOR VOICE MESSAGE CONTROL

(75) Inventors: Tim A. Williams, Danville, CA (US); Daniel A. Brookshire, Manor, TX (US); Dirk D. Eide, Leavenworth, WA (US)

(73) Assignee: Jetque, Danville, CA (US)

( * ) Notice: Subject to any disclaimer, the term of this patent is extended or adjusted under 35 U.S.C. 154(b) by 0 days.

(21) Appl. No.: 10/133,018

(22) Filed: Apr. 26, 2002

Related U.S. Application Data

(63) Continuation-in-part of application No. 10/084,413, filed on Feb. 26, 2002.

(51) Int. Cl.[7] .............................................. H04L 12/16
(52) U.S. Cl. ...................... 370/259; 370/310; 379/87; 379/88.11; 379/88.17; 379/88.25
(58) Field of Search ................................. 370/259, 310; 379/67.1, 87, 88.08, 88.11, 88.12, 88.15, 88.17, 88.18, 88.22, 88.24, 88.25, 201.01

(56) References Cited

U.S. PATENT DOCUMENTS

| | | | |
|---|---|---|---|
| 4,131,849 A | | 12/1978 | Freeburg et al. |
| 4,644,351 A | | 2/1987 | Zabarsky et al. |
| 4,873,520 A | | 10/1989 | Fisch et al. |
| 4,885,577 A | | 12/1989 | Nelson |
| 5,127,003 A | * | 6/1992 | Doll et al. .................. 370/259 |
| 5,524,137 A | * | 6/1996 | Rhee ...................... 379/88.01 |
| 5,625,675 A | * | 4/1997 | Katsumaru et al. ...... 379/88.25 |
| 5,633,916 A | * | 5/1997 | Goldhagen et al. ...... 379/88.17 |
| 5,742,668 A | * | 4/1998 | Pepe et al. .................. 455/415 |
| 5,767,786 A | | 6/1998 | Lopatukhin et al. |
| 6,119,179 A | | 9/2000 | Whitridge et al. |
| 6,151,572 A | | 11/2000 | Cheng et al. |
| 6,169,911 B1 | | 1/2001 | Wagner et al. |
| 6,233,318 B1 | * | 5/2001 | Picard et al. ............ 379/88.17 |
| 6,345,239 B1 | | 2/2002 | Bowman-Amuah |
| 6,389,276 B1 | * | 5/2002 | Brilla et al. ................ 455/413 |
| 6,445,694 B1 | * | 9/2002 | Swartz ....................... 370/352 |
| 6,498,835 B1 | * | 12/2002 | Skladman et al. ....... 379/88.12 |
| 6,507,643 B1 | * | 1/2003 | Groner .................... 379/88.14 |

FOREIGN PATENT DOCUMENTS

| | | |
|---|---|---|
| WO | WO 98/12677 A1 | 3/1998 |
| WO | WO 01/59998 A2 | 8/2001 |
| WO | WO 01/67241 A1 | 9/2001 |
| WO | WO 01/75555 A2 | 10/2001 |

OTHER PUBLICATIONS

PCT Search report mailed Feb. 26, 2003, International Application No. PCT/US03/05815 (6 pages).

* cited by examiner

Primary Examiner—Hassan Kizou
Assistant Examiner—Dmitry Levitan
(74) Attorney, Agent, or Firm—Blakely, Sokoloff, Taylor & Zafman LLP

(57) ABSTRACT

A communication system and method are described. In one embodiment, the method comprises a server determining to examine contents of audio files in a storage facility, the server accessing one or more audio files stored in the storage facility, and sending a text message over a packet data network channel, the text message containing information about the one or more accessed audio files.

51 Claims, 8 Drawing Sheets

APPARATUS AND METHOD FOR VOICE MESSAGE CONTROL

RELATED APPLICATIONS

This patent application is a Continuation-in-part (CIP) of patent application Ser. No. 10,084,413, filed Feb. 26, 2002, entitled "Method and Apparatus for Voice Message Control."

FIELD OF THE INVENTION

The present invention relates to the field of communications; more particularly, the present invention relates to accessing stored voice messages for subsequent manipulation and/or presentation.

BACKGROUND OF THE INVENTION

There are a number of technologies available for transferring text and voice information. For example, to transfer text information in real time, NetMeeting from Microsoft of Redmond, Washington may be used. Similarly, if non-real time text transfer is desired, but relatively quick communication in the approximate one to fifteen minute time frame is desired, then AOL Instant Messenger (AIM), Short Messaging Service over Cellular Networks (SMS) or paging (e.g., two-way paging, one-way paging) may be used.

If a longer period of delay is allowable, text information may be transferred using electronic mail (email) systems. Email systems always have to store a message and then have a recipient retrieve the message to access it. Also, there is no way to know if an email message from a specific person has been received until the email messages are retrieved. One email system disclosed in (Etrieve cite to be added) describes attaching a voice file to an email. The user receives notification of the email by a SMS messaging system, and when the email is responded to, the system retrieves the voice file from memory and plays back the voice file over a circuit switch voice channel. Therefore, even in this email system, it is still required in this system that the message (the voice file) requires the user to actively retrieve the voice file from a storage facility.

Long term archival of text messages is a common occurrence and may be performed by using, for example, CD-ROM. Long term archival of voice messages, however, is not performed today with the capability to effectively index the messages.

Many systems exist for transferring voice information. For example, in real-time voice transfer, a phone, wired or wireless, may be used. One of the wireless cellular carrier networks, Nextel, currently markets a cellular phone based system that includes two-way radio functionality that permits the user, by pressing a button, to use the phone as a two-way radio to transfer voice to preassigned individuals. Similarly, with respect to voice, there are a number of store and retrieve options for transferring voice such as, for example, voice mail. Also, with respect to archiving, there are a number of ways, such as CD-ROMs and tapes, that may be used to record voice files for archival purposes. However, with respect to the communication window of one to fifteen minutes, there seems to be no counterpoint in voice transfer technology that matches or equates to that of instant messaging, SMS or paging used in the transfer of text messages.

SUMMARY OF THE INVENTION

A communication system and method are described. In one embodiment, the method comprises a server determining to examine contents of audio files in a storage facility, the server accessing one or more audio files stored in the storage facility, and sending a text message over a packet data network channel, the text message containing information about the one or more accessed audio files.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
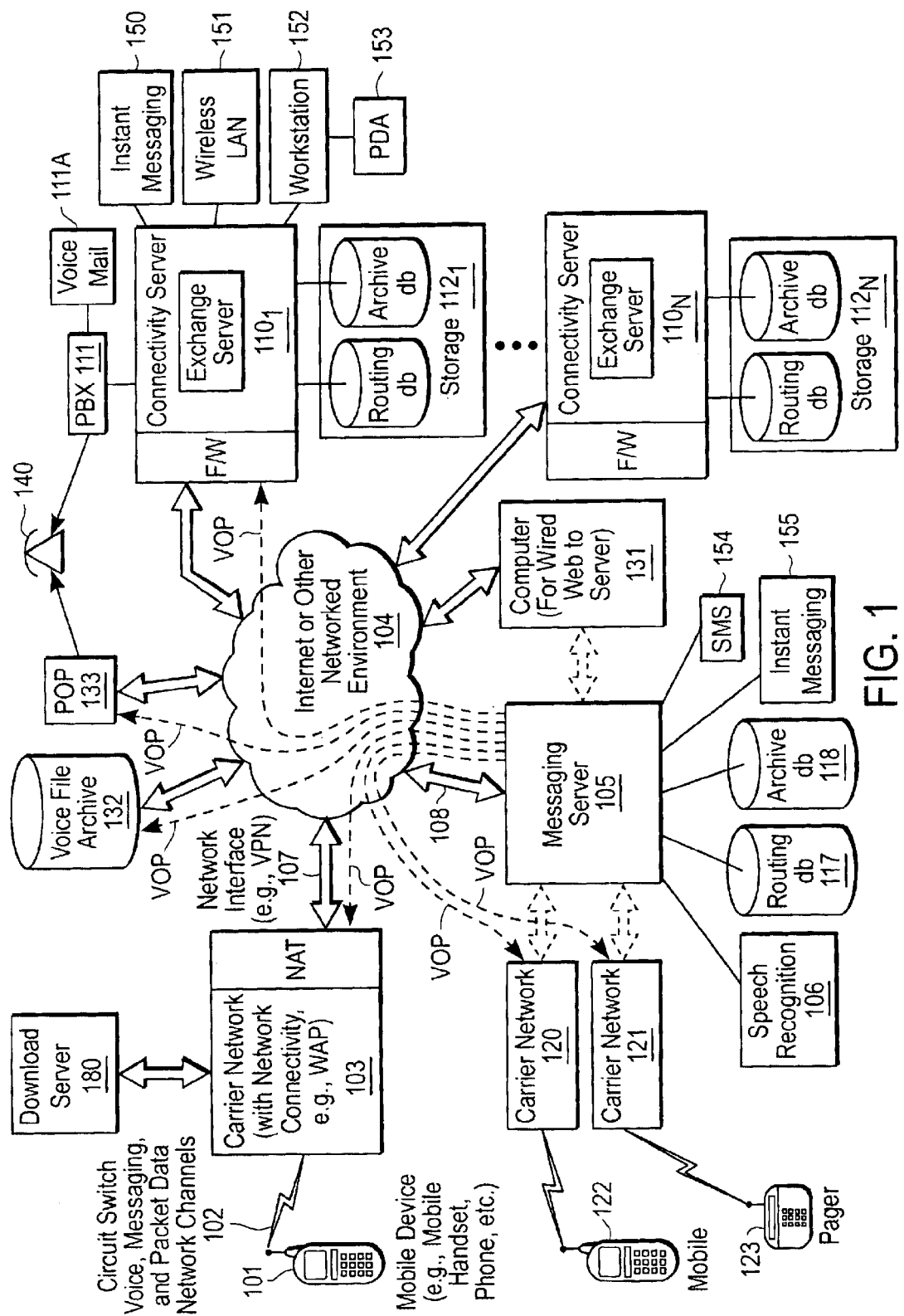
FIG. 1 illustrates an exemplary architecture of a communication system.

A communication system is described in which a user of a mobile device, such as a cellular phone, to put the phone in a particular mode, such as by pressing a button on the phone, and causing an audio (voice) message to be queued, sent over a packet data network channel and routed to a recipient or location specified in the message according to a pre-specified routing mechanism. The routing mechanism may cause the message to be forwarded to, for example, another cellular phone in the same carrier network, pager or other mobile device in a different carrier network, a telephone that is part of a Plain Old Telephone System (POTS), a personal digital assistant (PDA), a VoP terminal, or any voice capable device communicating via wireless LAN technologies.

A communication system is described that provides for the storage and retrieval by program control of voice messages contained within industry standard voice mail systems. Once the voice messages are contained within a program controlled environment, they may be manipulated, format converted, compressed, transferred into audio on any one of a variety of communication media, stored, indexed and/or deleted.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Exemplary Architecture

FIG. 1 illustrates an exemplary architecture of a communication system. Referring to FIG. 1, the voice messaging communication system may include a mobile device 101 (e.g., mobile handset, phone, computer, personal digital assistant (PDA), etc.) that is communicably coupled to a wireless carrier's network 103 via circuit switched voice, messaging and packet data network channels 102. In one embodiment, the circuit switched voice channel is a channel which primarily carries digitized and compressed voice represented as bits of information placed into a regular time slot on the channel (a wireline telephony example of a similar structure is that of a single voice channel, DS0, within a the T1 or DS1 carrier, a cellular phone network example is the voice channel of a Global System for Mobile Communications (GSM) phone), the messaging channel is used to primarily provide a call setup and roaming function for controlling the operation of mobile device 101, and the packet data network channel is a channel which provides packet data communications capability. In one embodiment, this packet data communications capability has a data rate of between 115 kb/s and 2 Mb/s. In one embodiment, the packet data channel is also used to communicate control information. In such a case, the packet data network channel operates as a digital channel. Alternatively, TDM channels may be transferred as well.

Carrier network 103 is coupled to the network interface (e.g., the VPN) 107 to Internet (or other network environment) 104. In one embodiment, carrier network 103 is Wireless Application Protocol (WAP)-enabled to allow Internet connectivity of a mobile device. In this way, WAP and packet data channels can co-exist. A download server 180 may be coupled to carrier network 103. Download server 180 may be used to download software to mobile device 101. This software may comprise a Java 2 Mobile Execution U2ME) program or other programs that mobile device 101 may use to process the voice messages and transmit them onto the packet data network channel.

Messaging server 105 is coupled to network environment 104 via network interface 108. One or more additional network carrier networks, such as carrier networks 120 and 121, providing access to mobile devices 122 and pager 123, respectively, are also communicably coupled to messaging server 105. Messaging server 105 may be communicably coupled to carrier networks 120 and 121 through network environment 104. This may be by Voice Over Packet communications (VOP). A version of VOP communications is known as VoIP. Such communications may be used for communication between messaging server 105 and carrier network 103 as well. In an alternative embodiment, messaging server 105 and one or more of carrier networks 120 and 121 may be co-located. In such a case, communication may occur directly between the parties, as opposed to going through network environment 104.

One or more connectivity servers $110_1$–$110_N$ may be coupled to network environment 104. Messaging server 105 communicates with each of connectivity servers $110_1$–$110_N$ through network environment 104. This communication may be by VOP. In one embodiment, each connectivity server $110_1$–$110_N$ is coupled to an exchange server (e.g., Microsoft Exchange Server) and also is coupled to storage 112, which may include one or more databases, including a routing database and an archival database. These databases may be stored in the same memory or separate memories.

Each connectivity server $110_1$–$110_N$ may be coupled to a PBX, such as PBX 111, which may include a voice mail system, to provide access to telephones within the PBX as well as circuit switched access to the PSTN or packet based access to other voice services, such as telephone 140. Note that some embodiments of connectivity servers may or may not include all the features shown in FIG. 1 and described herein.

Connectivity server $110_1$ is shown having access to an instant messaging unit 150 to use instant messaging, a wireless local area network (LAN) to communicate with a device accessible thereby, and a workstation 152 to contact PDA 153.

A point of presence (POP) 133 is also coupled to network environment 104 to provide access via Voice Over Packet (VOP) to telephones, such as telephone 140.

A voice file archive 132 is also coupled to the network environment 104 to archive voice messages. In one embodiment, communication between messaging server 105 and voice file archival is by VOP.

Messaging server 105 is coupled to SMS functional unit 154 and instant messaging functional unit 155, which provide access to SMS and instant messaging capabilities, respectively, to messaging server 105.

Messaging server 105 is also coupled to speech recognition processor 106, and optionally coupled to computer system 131, routing database 117, and an archival database 118. Computer system 131 may be coupled to messaging server 105 directly or through one or more intermediaries, i.e., such as network environment 104 (via, for example, web access) to set up routing information for individuals to be stored in routing database 117 or to access and manage (e.g., delete) voice messages stored in archival database 118.

Note that the term "server" as used herein is not limited to a single computer system executing software and may comprise one or more software processes running on one or more different computer systems.

In one embodiment, routing database 117 stores a routing address book of routing information specifying the communication mechanism that is to be used by messaging server 105 to forward a voice message during specific times of each day, week, month and/or year. For example, for one individual, the routing information may indicate that from 8:00–10:00 a.m. all voice messages should be forwarded to their regular land-line telephone via a wired line, (e.g., telephone 140 via PBX 111 accessed through corporate server 110 or POP 133), from 10:00 a.m. to 5:00 p.m. all voice messages should be forwarded to their cell phone via a specified carrier network (e.g., mobile 122 via carrier network 120), from 5:00 p.m.–7:00 p.m. all voice messages should be forwarded to their pager via a specified carrier network (e.g., pager 123 via carrier network 121), and from 7:00 p.m. to 8:00 a.m. all voice messages should be forwarded to archival database 118 (or voice message archive 132) for storage as a voice mail message for later retrieval. This routing information may be part of each user profile maintained in the system.

In one embodiment, the communication architecture described in FIG. 1 enables the user of a mobile device, such as mobile device 101, to perform one or more of the following types of communications: 1) an interpersonal communication (send to another person); 2) a group communication (send to a group of people, such as an engineering work group); and 3) memo to self; 4) interactions with computers. Examples of interaction with computers include access to scheduling and calendaring information that may be contained within a user's Outlook (e.g., Microsoft Outlook) program on the user's desktop computer or within the user's PDA. Another example of interaction with computers is allowing access to the user's account on a voice mail system for the purposes of control, message retrieval, and/or message storage.

Interpersonal Communications

To perform an interpersonal communication to communicate with another individual in a store and forward manner, a user of mobile device 101 activates mobile device 101. Activating mobile device 101 may comprise pressing a button (e.g., key on a keypad, soft button (e.g., touch screen touched by a finger)) or using some other selection mechanism (e.g., stylus, mouse click, speech recognition on the handset, etc.) on mobile device 101. Activating mobile device 101 may comprise receiving an authorization from a biometric device (e.g., a speech recognizer to identify an individual by their voice).

In response to this activation (e.g., selection), mobile device 101 causes utterances (a voice message) to be queued and sent as a voice file from mobile device 101 via a packet data channel and forwarded to another individual. In response to the button being pressed on mobile device 101, a voice message may be created and sent over packet data channel 102 to carrier network 103. Thus, pressing the button on mobile device 101 activates the packet data channel without dialing a phone number and mobile device 101 is able to send a voice message to another without having to perform any phone number lookup.

Carrier network 103 separates the packets received from mobile device 102 and sends them to messaging server 105. In one embodiment, a firewall of carrier network 103 normally allows unimpeded access to Internet 104. In one embodiment, carrier network 103 uses a virtual private network (VPN) connection (i.e., a port on the firewall of carrier network 103) to Internet 104 to send the packetized voice message received over the data packet network channel from mobile device 101. Carrier network 103 may perform a network address translation (NAT) to identify a packet stream from mobile device 101 as one to be forwarded to Internet 104.

Messaging server 105 determines actions to take with the voice message based on its contents. For example, a user of mobile device 101 may record a voice message such as "Call Mary engineering meeting is canceled." In response to receiving this message, messaging server 105 determines that a call is to be made to a specified recipient named Mary. In order to complete this call, messaging server 105 is able to determine who the specified recipient(s) (e.g., Mary in this example) is and how to contact the specified recipient (s).

Messaging server 105 may use speech recognition on the voice message to identify names of individuals contained in the message as well as one or more commands. In one embodiment, messaging server 105 knows the portion of the voice messages that are command words (or phrases) and names of specified recipients by constraining the command words (or phrases) to a predetermined set and constraining the location in the voice message of both the command words and named recipients (or entity). More specifically, constraining the context of the sentence, for example the first word is always one of a small set of words (e.g., call, schedule, forward, memo) followed by the recipient name as it is contained within the routing address book. The commands are identified by comparing recognized words with a list of preselected command words and individual words are parsed by the intervening silence.

In one embodiment, if the first word is not one of the predefined set of words, messaging server 105 saves the voice message and sends a menu list to the user of what actions are to be taken, e.g., call, schedule, forward, memo, and a list of recipients from the address book, if that is necessary. In another embodiment, if the speech recognizer cannot adequately determine the contents of the voice message, the voice message is routed to a human operator who performs the speech-to-text processing by listening to the message and transcribing it into text. The voice message may have digital signal processing performed on it prior to being routed to the human operator. An example of which is the reduction of background noise. Thus, messaging server 105 may reflect back to mobile device 101 a textual list of commands and/or recipients in response to the voice message if it was not clear after performing speech recognition who the specified recipient(s) is or the command(s) that is to be performed as a prompt to the user to clarify the desired command and/or recipient(s), if any. In such a case, messaging server 105 generates a text message with a command recognizable to the mobile device and sends the text message to carrier network 103, which forwards the message to mobile device 101. The text message may be sent to mobile device 101 over the messaging or packet channel. In one embodiment, the prompt can come either through WAP (packet channel), which causes the prompt to be presented on a static web page like browser interface, or in alternative embodiments, it can come through the packet channel to a JAVA or other similar program running on mobile device 101 that displays the prompt (e.g., menu) on a display of mobile device 101.

Messaging server 105 determines how to route the voice message to the specified recipient(s) by locating routing information for the specified recipient(s). In one embodiment, messaging server 105 accesses a local database, such as routing database 117, using the name of the specified recipient(s), to obtain the necessary routing information from a previously entered profile as specified by the user.

In an alternative embodiment, messaging server 105 locates the routing information for the specified recipient(s) by contacting one of the corporate servers. The corporate server maintains routing information for a number of individuals in a database. Messaging server 105 sends the name(s) of the specified recipient(s) and the sender to the corporate server, which accesses its database and provides the requested routing information. In one embodiment, the corporate server may use Microsoft Exchange Server or other similar functioning server to identify the routing information for the specified recipient(s) in response to receiving the name(s) of the specified recipient.

Note that if more than one corporate server is maintaining routing information, messaging server 105 identifies the corporate server that is storing the routing information for the specified recipient(s) it needs based on a unique identifier associated with the mobile device sending the voice message which identifies the user who is originating the message. More specifically, in one embodiment, each user, is assigned a unique identifier and this unique identifier is included in the packet header of the packets containing the voice message that is sent on the packet data network channel. When messaging server 105 receives the packets, it obtains this unique identifier and accesses a local memory that is able to associate a corporate server with the unique identifier. In one embodiment, the local memory includes a listing of all unique identifiers and their associated corporate server. In an alternative embodiment, a hash table is used and the unique identifier is used to hash to a value indicative of the corporate server associated with that unique identifier.

Thus, messaging server 105 determines how to route the voice file message to the recipient(s) specified in the voice message and routes the voice file to the specified recipient(s). Thus, the voice messages route themselves in that the information needed to determine where to route the messages is determined using the content of the voice message. For example, the determination of how to route the voice file to Mary may be based on local information, such as the information stored in the routing database 117, to which messaging server 105 has access, or may be determined by accessing another server, such as one of connectivity servers $110_1$–$110_N$. In the latter case, messaging server 105 would forward the name Mary to the corporate server, which would access a routing database, such as a routing database in storage $112_1$ and provide information indicative of how to route a message to Mary back to messaging server 105. Using that information, messaging server 105 routes the message to Mary.

The routing information may indicate that any voice message is to be routed to the specified recipient by way of another mobile device accessible via carrier network 103. In such a case, upon determining the specified recipient and the routing information specifying a mobile device in the coverage area of the carrier network 103, messaging server 105 sends a packetized stream through carrier network 103 via network environment 104, to be sent to the mobile device.

In one embodiment, messaging server 105 contacts the mobile device using the circuit switched channel in a typical fashion, such as by calling the mobile device. When the individual answers, messaging server 105 plays a voice prompt telling the individual that a voice message exists for the individual and asks whether the individual will like to hear the voice message. The individual may be instructed to indicate their desire to hear the message in one or more ways, such as, for example, by pressing a particular button on the mobile device, saying a particular phrase (which would be recognizable by messaging server 105), or selecting a menu item displayed on the phone. In response to the selection, messaging server 105 plays the message.

In an alternative embodiment, the packetized stream is sent to the mobile device via through carrier network 103 using the packet data network channel. In such a case, the mobile device includes functionality to play or review the voice message if sent via the packet data network channel. Such functionality includes a de-packetizer to depacketize the stream to retrieve the voice message and an audio player to operate in conjunction with any speaker of the mobile device to generate audio signals to drive the speaker to play the voice message.

In one embodiment, voice mail-like controls of play, skip, fast forward, backup, delete, and reply will be available to the user at the time of reviewing the voice messages regardless of the delivery mechanism of packet channel or circuit switched channel.

If the routing information indicates that the specified recipient is at a POTS telephone or a PBX station set, such as telephone 140, messaging server 105 may route the voice message to telephone 140 using Voice Over Packet (VOP) to POP 133 and onto telephone 140, or may gain access to a corporate servers' PBX, such as PBX 111, and utilize the connectivity server $110_1$ to initiate the call to telephone 140. In either case, messaging server 105 converts the packet data to analog voice to play the voice message.

If the routing information indicates that the specified recipient is on a mobile device of another carrier network, messaging server 105 may initiate a call to that other mobile device. For example, it specifies individuals at mobile phone 122, messaging server 105 may initiate the call through to carrier network 120 in order to place the call to mobile device 122 in the same way the call is made and the message is delivered as described above. That is, if a packet data network channel is not being used, messaging server 105 may convert the voice message to analog speech using the an appropriate converter and send a call to mobile device 122 using a circuit switch voice channel. Further, alternatively, messaging server 105 may send use a voice-to-text converter to generate text messages and send it to the mobile device via a messaging or packet channel, if such a messaging or packet channel is available.

If the specified recipient is on a device such as (one-way or two-way) pager 123, messaging server 105 converts the voice file to text and sends the text as a text message to the pager through its carrier network (e.g., pager 123 through carrier network 121).

Note that, in one embodiment, if an individual declines to receive a voice message after being prompted regarding its availability or does not respond to the call from messaging server 105, messaging server 105 may store the message into the individual's voice message storage archival facility, such as voice mail archive 132, or has the message played into a voice mail system, such as voice mail 111A by connectivity server $110_1$. This connection with the voice mail system 111a is performed by the connectivity server. One method to perform this operation is for the connectivity server to place a phone call (circuit switched or VOP) into the PBX essentially dialing phone number corresponding to the user's voice mail box extension. In one embodiment, when a voice message is archived, the voice message is tagged with the date and time of the voice message, as well as the sender and specified recipient(s) of the voice message and message length and priority.

Group Communications

Group communications may be performed in the same manner as interpersonal communications except that the specified recipient of the voice message received by messaging server 105 comprises the name of a group or a multiplicity of recipients. In such a case, in one embodiment, routing server 105 or corporate server 105 includes a database listing created by the sender or surrogate of each individual in the group and obtains the routing information for each of the individuals in the group. Using the routing information for each of the individuals in the group, messaging server 105 forwards the voice message to each individual as individual communications. Thus, if the routing information in each of the specified recipients' profiles are to multiple devices, including different types of devices (e.g., cellular phone, pager, landline telephones, etc.), messaging server 105 routes the message to each device as a separate communication.

Alternatively, messaging server 105 uses the unique identifier in the packet header to identify a corporate server and sends the group name to the corporate server. In response, the corporate server sends the routing information for each of the members in the group to messaging server 105 so that messaging server 105 is able to route the voice file to the individuals in the group correctly.

Memos

The architecture may enable an individual to send themselves a memo. In such a case, the user of a mobile device, such as mobile device 101, presses a button or other selection mechanism on their mobile device to record a voice message with an indication that the voice message is a memo. This voice message is then packetized and sent to messaging server 105, which identifies it as a memo and stores the memo in an archive (e.g., archive 132, archive 118, etc.).

Memos may be retrieved by the individual in the same way as a voice message or the memo may be scheduled to return to the user at a specific time and date. In one embodiment, a browser interface may be used to access and review messages, including memos. This browser interface allows the user to audio playback the message and/or have it converted to text and displayed.

Alternatively, individuals may forward memos to other people.

In one embodiment, messaging server 105 automatically creates an email to the mobile device user by converting the voice file to text and sending the email to the user via normal email facilities.

If an Outlook-based system is employed, a reminder or notification may be launched automatically from Outlook. This is performed by the connectivity server obtaining information from the user's Calendar or PIM (Personal Information Management) system (e.g., Microsoft Outlook) regarding the onset of a calendar or memo event. The connectivity server associates the event with a voice file and schedules a voice message to be transmitted to the user. The voice file can either be a prerecorded message or be created from the event itself via a text-to-speech system associated with or part of the messaging server.

Note that in alternative embodiments, the voice messaging described herein may be performed with a device that is not a mobile device. For example, the voice messaging may be performed with a PSTN phone. In such a case, the PSTN phone dials into messaging server 105 and leaves a message. Messaging server 105 processes the message in the same manner as if received from a mobile device.

Other Features of the Architecture

In one embodiment, messaging server 105 archives voice messages and other information for billing purposes. Such information may be archived using database 118 or voice message archive 132. Similarly, corporate server $110_1$–$110_N$ may include a portion of storage $112_1$–$112_N$, respectively, for use as an archive.

In one embodiment, download server 180 enables over-the-air download of software modules, such as for example, J2ME, to reconfigure a mobile device. In such a case, download server 180 downloads software to carrier network 1xx, which sends the software to a mobile device;- such as mobile device 102. Therefore, even if mobile device 102 is not initially programmed to engage in the non-real time communication described herein, it can be after being deployed. More specifically, in one embodiment, each carrier network includes a specific Multipurpose Internet Mail Extensions (MIME) number for a particular application run by the mobile device. The MIME number allows a user browsing the world wide web on the cell phone to cause an application to be downloaded to the cell phone for use.

Exemplary Flow Processing

Figure 2:
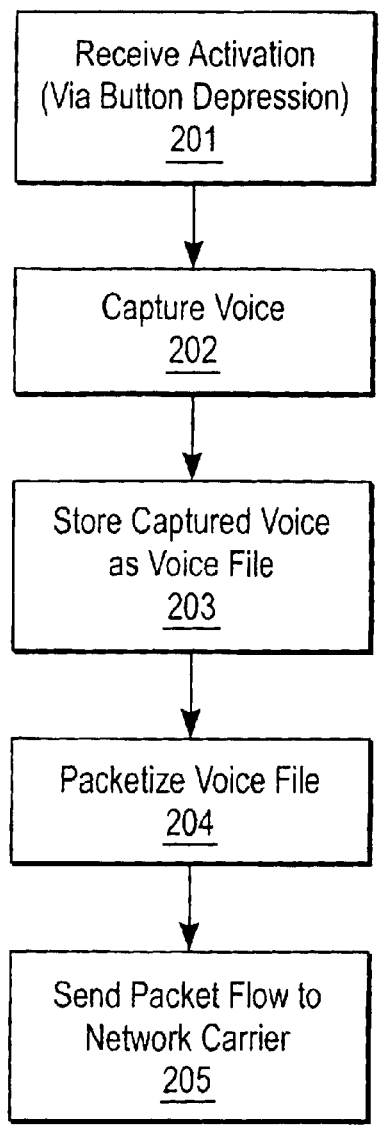
FIG. 2 is a flow diagram of one embodiment of a process performed by a mobile device (or other device with communication capabilities) in a network environment.

FIG. 2 is a flow diagram of one embodiment of a process performed by a mobile device in a network environment. The process is performed by processing logic which may comprise hardware (e.g., circuitry, dedicated logic, etc.), software (such as run on a general purpose computer system or a dedicated machine), or a combination of both.

Referring to FIG. 2, processing logic in a mobile device receives an activation indication (processing block 201). In one embodiment, such an activation may be received in response to the pressing of a button on the mobile device. The button may comprise a key on a keypad. In response to receiving the activation, the processing logic captures utterances (voice) (processing block 202) and stores the captured utterances in a file as a voice message (processing block 203). Subsequently, processing logic in a mobile device packetizes the voice file (processing block 204) and sends the packet flow to the network carrier (processing block 205).

Figure 3:
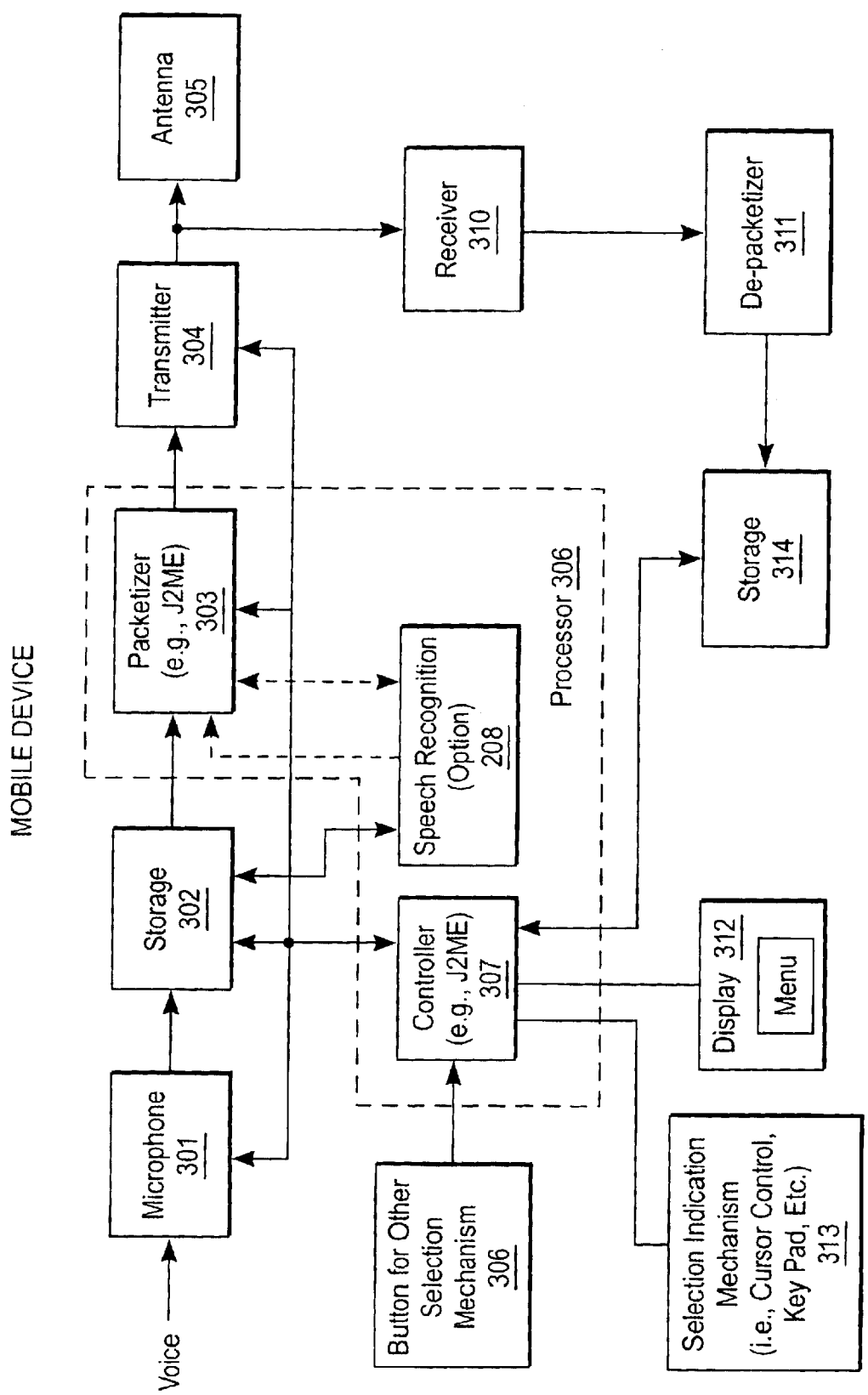
FIG. 3 is one embodiment of a mobile device.

FIG. 3 is one embodiment of a mobile device, such as mobile device 101. Referring to FIG. 3, the user depresses a button or key, performs a stylus selection, or uses some other selection mechanism 306 that signals to controller 307 to operate in a non-real time mode. In response to depression of the button or other activation, microphone 301 records utterances or other audio information and stores the recorded utterances in storage 302.

The recorded utterances in storage 302 are packetized by packetizer 303 under control of controller 307 and transmitted wirelessly using transmitter 304 and antennae 305 to the carrier network using a packet data network channel (such as shown in FIG. 1). Packetizer 303 may be part of a channel modem on the mobile device that is coupled to transmitter 304. In one embodiment, although not shown, a codec and digital signal processor (DSP) may be included, where the DSP performs Linear Predictive Coding (LPC) on the recorded stream of utterances (prior to packetization) in a manner well-known in the art. In an alternative embodiment, the data stream may be processed by a codec and then the digital signal processing may be performed along with the packetization by a process running on processor 306.

In one embodiment, the recorded utterances stored in storage 302 undergo speech recognition using speech recognition 208. The recognized work are stored back in storage 302 or provided directly to packetizer 303.

In one embodiment, controller 307 and packetizer 303 are part of the processor 306. More specifically, processor 306 runs software that can set up and launch calls. This software packetizes voice input and causes the packets to be sent on to a data packet channel. Thus, in one embodiment, this software may include the functions performed by controller 307 and packetizer 303. In one embodiment, processor 306 executes a Java 2 Mobile Execution (J2ME) program such that the mobile device functions as a thin client. In one embodiment, the J2ME program (or another program executed by processor 306) includes a speech recognition routine to perform the speech recognition associated with speech recognition 303.

At times, such as when the messaging server is providing menu options to the user, a mobile device, mobile device utilizes a received path that includes receiver 310 that receives a service of packets from the messaging server that are depacketized using depacketizer 311 and stored in storage 314. Control 307 accesses the packets in storage 314 and displays them on display 312 as a menu selectable by the user. The user may use selection indication mechanism 313 to make a selection of one of the menu options. In one embodiment, the selection indication mechanism 313 may comprise a cursor control device, a keypad device, stylus, or other well known input device for selecting menu options on a display screen. The result of the selection sent by controller 307 to packetizer 303 and transmitted back out on packet data network channel to the messaging server.

Although not shown, the coupling of antennae to 305 to transmitter 304 and receiver 310 is usually through a switch or duplexer.

Figure 4:
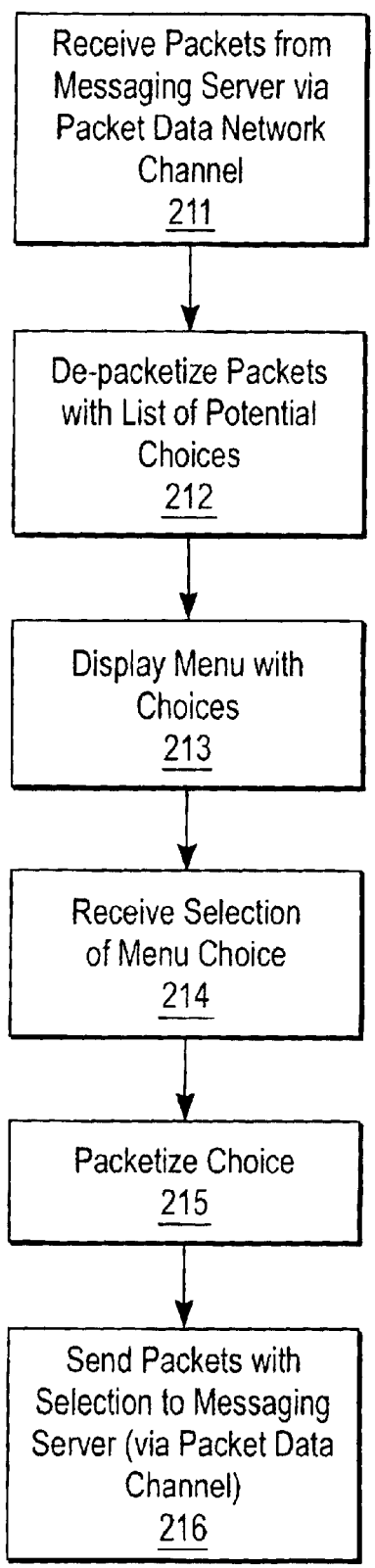
FIG. 4 is a flow diagram of one embodiment of a process performed by a mobile device to process menu items.

FIG. 4 is a flow diagram of one embodiment of a process performed by a mobile device to process menu items from a messaging server. The process is performed by processing logic which may comprise hardware (e.g., circuitry, dedicated logic, etc.), software (such as run on a general purpose computer system or a dedicated machine) or a combination of both.

Referring to FIG. 4, processing logic in a mobile device receives packets from the messaging server via the packet data network channel (processing block 211). In an alternative embodiment, the information from the messaging server is sent through the network carrier to the mobile device via a messaging or packet channel.

In response to receiving packets on the packet data network channel, processing logic in the mobile device de-packetizes the packets (processing block 212) and displays the menu with choices based on the information in the packets (processing block 213).

Subsequently, in response to a user selection, the processing logic in the mobile device receives the selection of a menu item (processing block 214), packetizes the selection (processing block 215), and sends the packets that include the selection to the messaging server via the packet data network channel and the carrier network (processing block 216).

If the menu is sent on the messaging channel, the user is able to respond by sending a responding message on the message channel in a well-known manner. Assuming the user selects one of the available menu options, the messaging server is able to comprehend the selection based on the fact that the messaging server sent the menu.

Voice Message Routing

Figure 5:
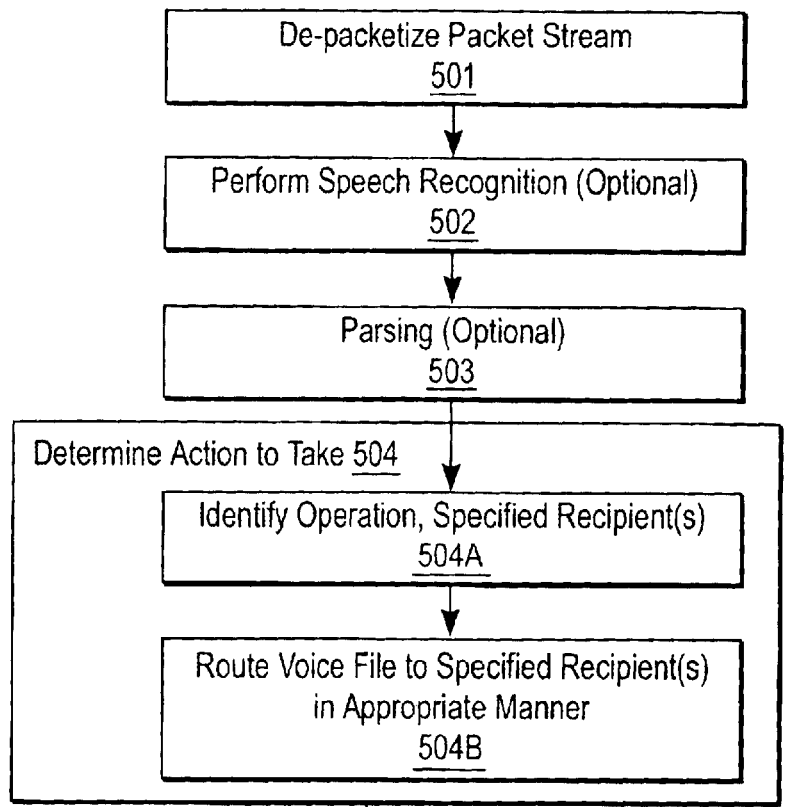
FIG. 5 is a flow diagram of one embodiment of a process for routing a voice message.

FIG. 5 is a flow diagram of one embodiment of a process to route a voice message. The process is performed by processing logic which may comprise hardware (e.g., circuitry, dedicated logic, etc.), software (such as run on a general purpose computer system or a dedicated machine), or a combination of both. The process may be performed by messaging server 105 of FIG. 1, which runs software.

Referring to FIG. 5, processing logic in the messaging server depacketizes the packet stream containing a voice file received from mobile device, such as mobile device 101. The depacketizing may be performed by processor, general purpose or dedicated, running a depacketization module (routine). Alternatively, a depacketizer unit may be coupled to messaging server 105.

Processing logic in the messaging server then performs speech recognition (processing block 502). This may be optional in situations where the voice message received from the mobile device has already undergone speech recognition. The speech recognition may be performed by a speech recognition unit, speech recognition processor running a speech recognition module, or a general purpose processor running a speech recognition module.

Using the speech recognized information, processing logic in the messaging server may optionally perform parsing to identify key words or phrases in the voice message (processing block 503). Such parsing may be useful in identifying commands or specified recipients associated with the call so that a proper routing of information is performed by the messaging server. The parsing may be performed by a processor, general purpose or dedicated, running a parser module. Alternatively, a parser may be coupled to or associated with the messaging server.

With the speech recognized voice message, processing logic in the messaging server determines an action to take (processing block 504). In one embodiment, the processing logic determines an action to take by identifying the operation and the specified recipients (processing block 504) and routing the voice message to the specified recipients in the appropriate manner (processing block 504B). The routing may be performed by a processor, general purpose or otherwise, running a communication routing module, in conjunction with communications functionality (e.g., network information cards, transmitters, receivers, etc.) capable of performing all the necessary communications. Alternatively, the routing may be performed by a communication or routing unit.

Figure 6:
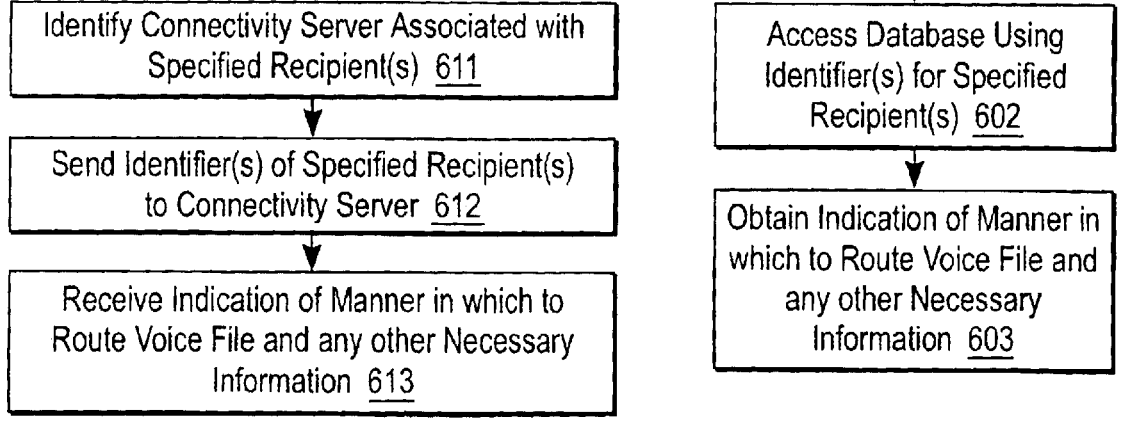
FIG. 6 is a flow diagram of one embodiment of the process to identify an operation and specified recipient(s).

FIG. 6 is a flow diagram of one embodiment of the process performed by the messaging server to identify an operation associated with a voice message and one or more specified recipients. The process is performed by processing logic which may comprise hardware (e.g., circuitry, dedicated logic, etc.), software (such as run on a general purpose computer system or a dedicated machine), or a combination of both. In one embodiment, the process is performed by messaging server 105 of FIG. 1 running software.

Referring to FIG. 6, the processing logic in the messaging server initially determines whether routing information of the specified recipient(s) is stored locally (processing block 601). If the routing information of the specified recipient(s) is stored locally, processing logic in the messaging server accesses the database using identifiers for the specified individual(s) (processing block 602) and obtains an indication of the manner in which to route the voice message and any necessary information to the specified recipient(s) (processing block 603).

If the routing information of the specified recipient(s) is not stored locally, processing logic identifies a server (e.g., a connectivity server, a corporate server, etc.) associated with the specified recipient(s) (processing block 611), sends the identifier for the specified person to the identified server (processing block 612), and subsequently receives an indication of the manner in which to route the voice message to the specified recipient(s) and any necessary information to do so (processing block 613).

Switching Between Channels on the Mobile Device

In one embodiment, when using the mobile device for a circuit switch call, the user may press a button or use another selection mechanism to activate the packet data network channel. In such a case, the circuit switched call is put on hold by the mobile device continuing to process received packets/frames from the circuit switched network while sending idle speech data patterns into the network from the mobile device transmitter. Meanwhile, the speaker and microphone will be utilized by the packet channel process. In one embodiment, the speech decoder/encoder that is coupled between a speaker and a microphone on the mobile device and the mobile device's antenna is left running while its connections between the speaker and microphone are disconnected or disabled. In an alternative embodiment, a signal is sent to the cellular network provider who places the call into the hold state until further notified. When the user is finished with the packet data network channel, then the user presses the button or activates the selection mechanism again and the user is returned to the circuit switched call. This allows for the interruption of a circuit switched call to provide information to the messaging server. Interrupting a call to utilize the packet data channel may be useful, for example, to allow the user to place a caller on hold to make a meeting time notification within his personal information manager (PIM) through the messaging server to the connectivity server to the exchange server and the PIM.

These communications have a number of characteristics that will be described in more detail below. These characteristics may include, for one or more embodiments:

1) the communications are non-real time;
2) permit voice and data to the phone;
3) support group/chat room interactions;
4) may interact with PIM software based (as opposed to typing in the information), which permits a) launching of reminders or notifications from the PIM, b) the scheduling of calendar events (with conflict notification), and c) the ability to access the PIM address book for use in the routing of messages; and
5) an instant messaging interface to allow for speech based interaction. This utilizes text to speech and speech to text conversion software.

Figure 7:
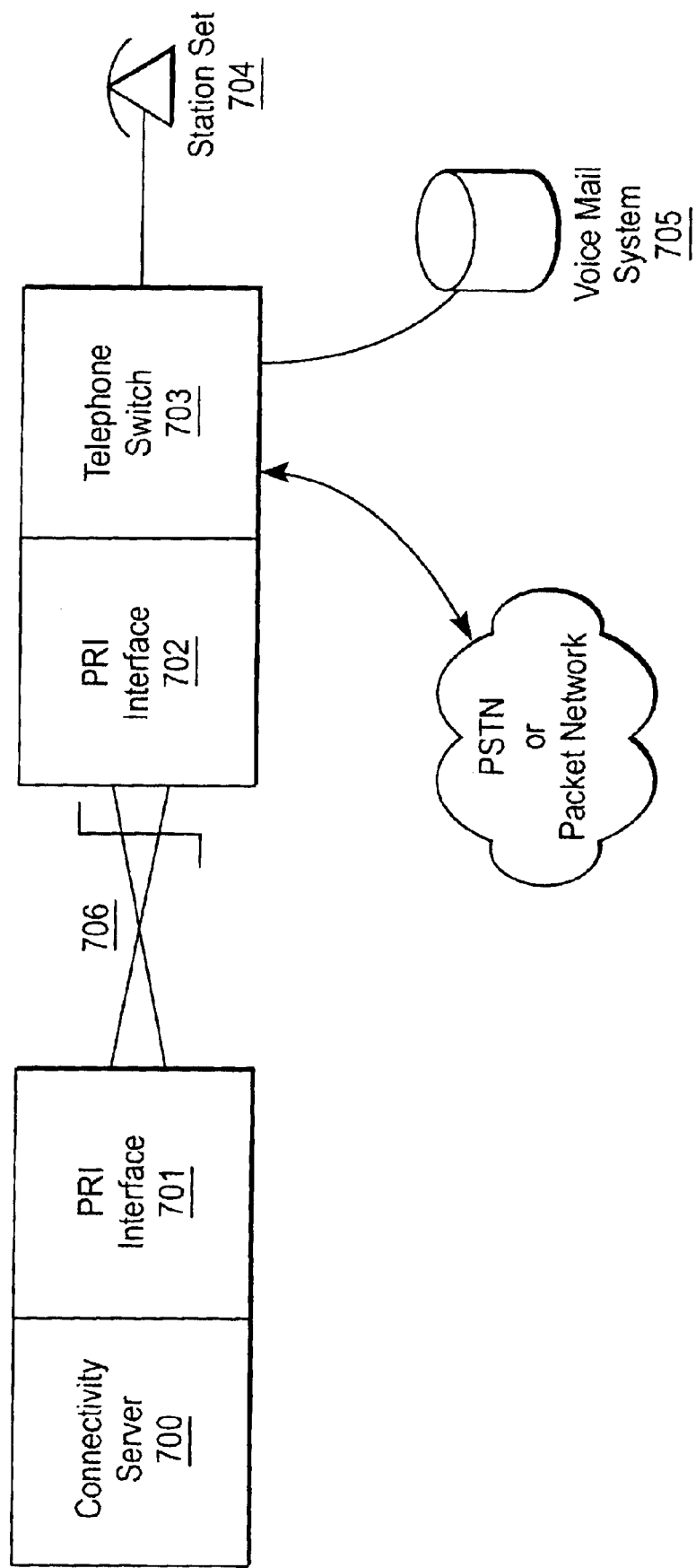
FIG. 7 illustrates an exemplary architecture for accessing stored voice messages.

FIG. 7 shows the architecture of one embodiment of a communication system that may be used for the storage and retrieval of voice messages (audio files) stored within voice mail systems (storage facilities). Referring to FIG. 7, in one embodiment, connectivity server 700 can be the connectivity server 110 in FIG. 1. Connectivity server 700 may be a physically distributed process. In other words, the processes described herein may be performed on a single server or on multiple servers (which are logically the same.) Connectivity server 700 includes an interface is added to the server hardware and software to provide for the provisioning of a Primary Rate Interface (PRI) 701.

Telephone switch 703 can be any type of circuit or packet switched voice switching system. Examples of telephone switches include PBX equipment, Centrex switches, Central office switches, Voice over Packet (VoP), Voice over IP (VoIP) voice switching systems. Telephone switch 703 provides voice connectivity between the PSTN or the packet network and station set telephones provided for the user. In one embodiment, telephone switch 703 allows the user to access the PSTN or VoP networks. In one embodiment, telephone switch 703 also allows for the storage and retrieval of voice messages within an adjunct voice mail system 705. Voice mail system 705 may be coupled to or part of a telephone switch. Voice mail systems are normally connected to a telephone switch via proprietary hardware and software interfaces and do not provide for the direct manipulation of their contents from within program control. For example, an offered PSTN call to station set 704 results in the activation of voice mail system 705 under certain conditions set within telephone switch 703. One such condition is the station set busy state of station set 704. As a result of station set 704 being busy, the offered call is routed to the voice mail system for the purpose of storing a voice message. Such a message is later retrievable by the station set owner via an access code. This application describes a store and retrieve communication system for voice messages intended for station set 704. Station set 704 may be one of the mobile devices described above.

PRI interface 702 provides for the provisioning of a Primary Rate Interface within telephone switch 703. Cable 706 is a PRI cable that crosses over the interface points of the PRI, i.e. exchanging the transmission and the reception interface. This allows PRI interface 701 to communicate directly with PRI interface 702 via the PRI. In one embodiment, the CCITT Q931 standard call setup and teardown over PRI is used.

In one embodiment, connectivity server 700 has a speech recognizer to perform speech recognition and a speech synthesizer to perform speech synthesis. These may be implemented with automatic speech recognition (ASR) and speech synthesis (e.g., Text-to-Speech (TTS)) software and/or hardware.

In one embodiment, connectivity server 700 determines that the contents of the voice mail box for station set 704 (e.g., for a subscriber) should be examined. This determination may be performed in response to one of a number of potential indicators. For example, connectivity server 700 may poll the voice mail box at regular or scheduled intervals. Another method is for the message waiting light (or other such indicator), provided on many PBX systems, to be reflected onto one of the ports provided by the PBX at the PRI interface point. This can occur through the use of ghost ports, where everything that happens on port 704 is reflected to another port. Telephony control (e.g., a program in connectivity server 700, hardware in connectivity server 700, or both) may instruct telephone switch 703 to turn on the message waiting light for station set 704. This telephony control may generate a message light indication (e.g., a stutter tone, a 90 volt light turned on, a digital message through a digital protocol between telephone switch 703 and station set 704 that tells station set 704 to turn on the message waiting light). Alternatively, connectivity server 700 may detect the presence of stutter tone, as provided with many Centrex systems.

In one embodiment, connectivity server 704, through connectivity server telephony control, retrieves voice messages that are stored on voice mail (VM) system 705 by launching (offering) a call through the PRI interface into telephone switch 703. The connectivity server telephony control dials the voice mail server of VM system 705 directly, bypassing station set 704. This prevents station set 704 from audibly ringing when the connectivity server telephony control's call is offered. The connectivity server telephony control determines the call progress of the offered call in terms of setting a connection (e.g., offered call, waiting; dialing, ringing, answering, etc.) by utilizing speech recognition software and/or hardware provisioned within connectivity server 700. Alternately, digital signal processing (DSP) algorithms can be utilized to detect tone components generated by VM system 705 and telephone switch 703. Upon determining the cessation of ring tone, the connectivity server telephony control captures the speech utterance of VM system 705 and processes the speech through an ASR on connectivity server 700. In an exemplary call flow, the connectivity server telephony control then provides VM system 705 with the user's mail box/station set extension and PIN number which either the user and/or administrative IT manager had previously provisioned within the user's profile settings on connectivity server 700. The connectivity server telephony control may use DTMF tones generated within connectivity server 700 or alternatively speech generated from the TTS hardware and/or software within connectivity server 700 to provide the user's mail box/station set extension and PIN number when prompted by the voice mail system. In an exemplary call flow, the connectivity server telephony control then processes the speech from VM system 705 with the ASR hardware and/or software of connectivity server 700 to determine the number of new messages and the number of old messages. The connectivity server telephony control then causes VM system 705 to play the stored voice mails in audio form by generating the DTMF tones or audio controls necessary to cause VM system 705 to begin this operation. An example call flow is as follows:

1) the connectivity server telephony control offers a call to station 123;
2) the voice mail system answers the call after a call forward on busy by the telephony switch to the VM system;
3) the voice mail system plays audio prompt "Hi, the is Bob . . . Please leave a message at the beep";
4) the connectivity server telephony control sends the pre-configured user access sequence, by generating the DTMF tones indicative of the required sequence;
5) the voice mail system validates the user access sequence;
6) the voice mail system plays audio information, "You have 5 new voicemails and 6 old voicemails . . . Press 1 to play your new messages";
7) the connectivity server telephony control uses speech recognition to determine the numbers "5" and "6" in the previous audio information;
8) the connectivity server telephony control generates the DTMF tone for "1";
9) the voice mail system receives the DTMF tone for "1" and plays audio information about the first message "message received at 10:42 AM" then begins to play the content of the message;
10) the connectivity server telephony control uses speech recognition to determine the audio information "10:42 AM" and then begins to record the message;
11) the voice mail system finishes playing the first message and prompts the user for directions on what to do with the message, "Press 1 to delete, 2 to save"; and
12) the connectivity server telephony control generates the appropriate DTMF tone to delete or save the message dependent on the previously configured information in the user's profile on the connectivity server.

This sequence continues until all the messages have been played.

In one embodiment, t he connectivity server telephony control records the voice messages into storage areas within connectivity server 700 for later manipulation. In an alternate embodiment, the connectivity server telephony control plays the message to determine key parameters of the message, such as, for example, length, originator, and/or urgency level and leaves the message on VM system 705 essentially using VM system 705 as a voice storage facility. The originator and/or urgency level may be determined by using ASR on portions of a voice message to identify the individuals that left the message and determine the urgency level.

The above scenario describes one of many call progress scripts that can occur. Other scenarios are determined by the voice mail system's proprietary methods and vary greatly from VM system to VM system. The connectivity server telephony control determines its call progress from a set of scripts that are provided within connectivity server 700. The selection of which script to utilize is determined by the user profile as set within connectivity server 700. Note that the connectivity server telephony control is not restricted to interacting with a single voice mail system on behalf of the user. The connectivity server telephony control can interact with multiple VM systems that are external to the telephony switch environment by placing a call through a telephony switch to an external VM system via the PSTN or packet networks. Thus, the JTS can aggregate multiple VM systems into a single presentation to the user of the contents of multiple VM systems.

Figure 10:
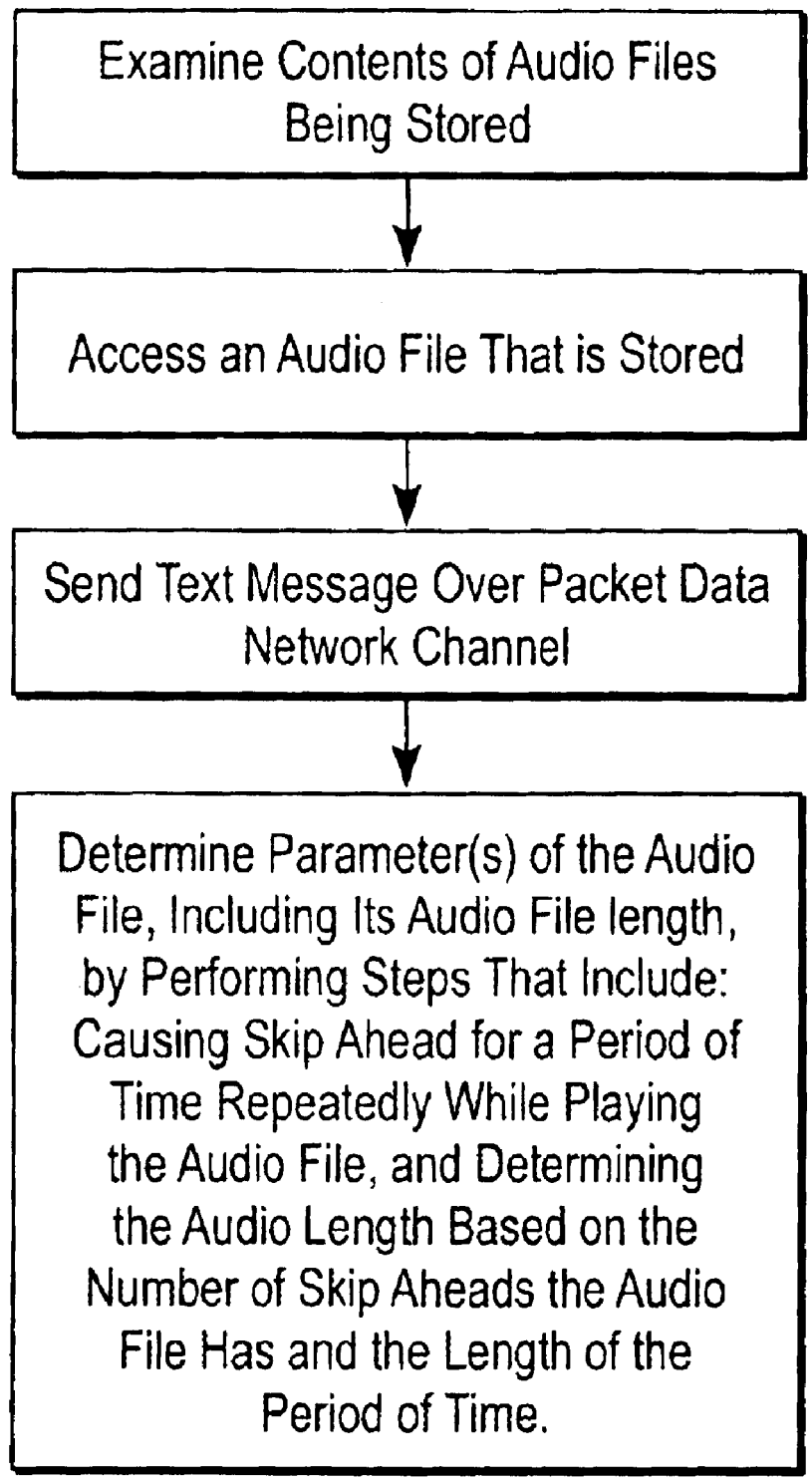
FIG. 10 is one embodiment of a process for using a skip ahead procedure.

The parameters of a voice message can be its length, its urgency level, its originator, and its time of arrival into the VM system. Determining the VM's length is accomplished, in most VM systems, by playing the message and measuring the time. Note that the entire message need not be played linearly in that in some VM systems the connectivity server telephony control can repeatedly skip ahead by some period of time in the message, e.g. 10 seconds at a DTMF command and calculate the message length to an accuracy of plus or minus 10 seconds. This is shown in FIG. 10. The urgency level can be determined by performing automatic speech recognition (ASR) the VM system's spoken urgency level for each message. The originator can be determined by the connectivity server telephony control capturing and performing ASR on the calling number ID information captured by the VM system and spoken by the VM system on playback of the message. The originator can also be determined by ASR of the voice mail contents. In this case, in one embodiment, the user's voice mail message prompt asks the user to begin the message by stating his name. On playback, the connectivity server telephony control performs ASR on this information and attempts to correlate the name to a name contained within the user's address book that has be previously provisioned into connectivity server 700 or within access of connectivity server 700 in locations such as the address book of the Personal Information Manager (PIM) of the user. An example of this would be the Microsoft Outlook address book accessible by connectivity server 700 via an exchange server (e.g., Microsoft exchange) server on the corporate internal network. The time of message arrival into the VM system is determined by the connectivity server telephony control via performing ASR on the spoken time by the VM system when the VM system states the time.

In one embodiment, the connectivity server telephony control can control VM system 705 via DTMF tones causing it to play the message at faster speeds, thus reducing the amount of time consumed on the PRI for interfacing with a single VM box, back up, skip ahead, etc.

Once the connectivity server telephony control determines that the user has voice mail messages and has determined the key parameters of those messages, connectivity server 700 provides this information to the user's mobile device by sending a text message over one of the packet channels available to the mobile device. The mobile device, which, in one embodiment is running a software program (e.g. a J2ME JAVA program), presents a list of messages or a set of icons representing the messages to the user. The user can then select one or multiple list items from the mobile device's display. This selection along with the mobile user device ID and the phone number for presentation is communicated back to connectivity server 700 via a wireless packet channel (e.g., packet data network channel, messaging channel) or wired packet channel (element 131 of FIG. 1) and the internet as described above. The user device ID is a number pre-assigned to the user and device so if a user has multiple devices each has a unique number that is known to the communication system as being uniquely that particular user's device. In one embodiment, upon receiving of the selection information, connectivity server 700 originates a call via the PRI interface to the phone number for presentation and causes the selected voice mail message to be played to the user over the audio path created by the Circuit Switched call or the packet switched (e.g., VoP) call. In one embodiment, the user has VM like control via DTMF tones of the playback of the voice mail. That is, for example, the user can skip forward or back, speed up or slow down the play, delete the message, and/or save the message. These operations may be selected by the user by normal button pushes on the phone causing the generation of DTMF tones. The connectivity server telephony control implements the user's selections.

Note that for systems in which the message is stored within connectivity server 700, the connectivity server telephony control has direct control of the message. For systems that utilize the storage of the VM system, the connectivity server telephony control places a second call through the PRI to VM system 705 and bridges the audio through to the remote user including translating the control information for the playback of the message.

In an alternative environment, the connectivity server telephony control provides the audio via a packet channel directly to the mobile device either by offering a VoP call or by directly utilizing the digital packet data network channel to carry the packetized voice of the message to the user. Using non-wireline, VoP techniques can improve the performance of the system by accounting for the environment of the wireless packet channel with its fading handoff, roaming and dropout conditions.

Once the VM message has been played to the user, the user can select the next message via DTMF control or text menu control over the digital packet data network channel or the user can terminate the audio portion of the call by hanging up.

Figure 8:
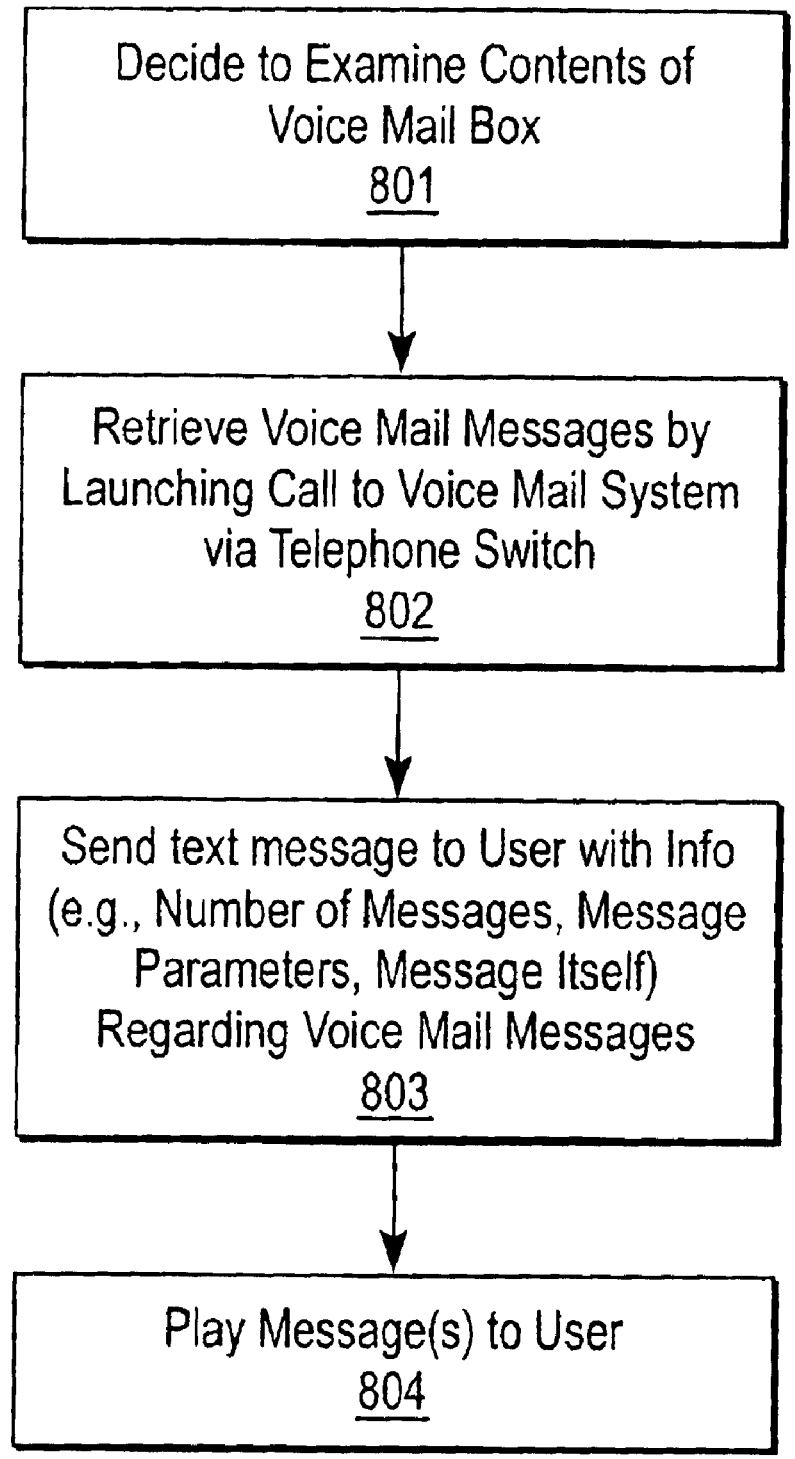
FIG. 8 is a flow diagram of one embodiment of the voice mail control process described above.

FIG. 8 is a flow diagram of one embodiment of the voice mail control process described above.

Figure 9:
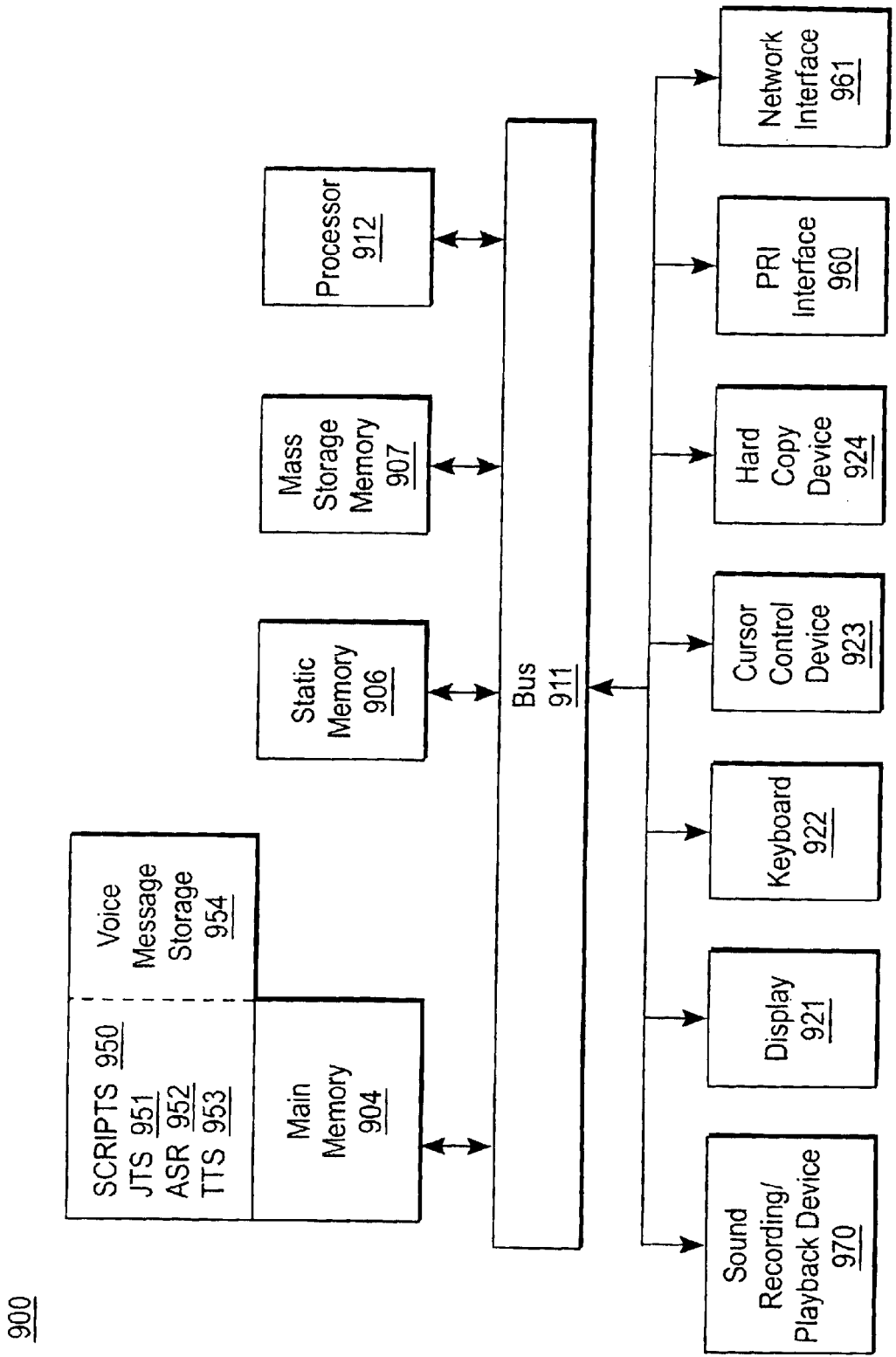
FIG. 9 is a block diagram of a one embodiment of a connectivity server.

FIG. 9 is a block diagram of a one embodiment of a connectivity server. Referring to FIG. 9, the connectivity server may comprise a computer system 900 in which the features of the present invention may be implemented. Computer system 900 comprises a communication mechanism or bus 911 for communicating information, and a processor 912 coupled with bus 911 for processing information. Processor 912 includes a microprocessor, but is not limited to a microprocessor, such as Pentium™, PowerPC™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912. Main memory 904 may store the scripts 950 associated with each of the different voice mail systems that are to be communicated with using the connectivity server, as well as the connectivity server telephony control 951 with modules to perform the specific functions (e.g., launching a call, receiving a call, playing a message, recording audio, dialing a number, deleting a message, speech recognition, text-to-speech conversion, etc.). Also stored in memory 904 is ASR software 952, TTS software 953, voice mail messages 954 retrieved from voice mail systems, and communication software for running the PRI interface 960 to provision a PRI, the network interface 961 to interface with one or more networks (e.g., Internet, WAN, LAN, etc.) and any other input/output devices described herein.

Note that in an alternative embodiment, the software and the functions performed in response to execution thereof may be performed instead using hardware in computer system 900 or a combination of hardware and software.

Furthermore, a sound recording and playback device 970, such as a speaker and microphone are coupled to bus 911 for audio interfacing with computer system 900.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for printing instructions, data, or other information on a medium such as paper, film, or similar types of media. Note that any or all of the components of system 900 and associated hardware may be used in the present invention. However, it can be appreciated that other configurations of the computer system may include some Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   a server determining to examine contents of audio files in a storage facility;
   the server accessing one or more audio files stored in the storage facility; and
   sending a text message over a packet data network channel, the text message containing information about the one or more accessed audio files;
   the server determining one or more parameters of the one or more audio files retrieved from the storage facility, wherein one of the one or more parameters comprises audio file length;
   the server causing the storage facility to skip ahead a period of time repeatedly while playing at least one of the one or more audio files and determining the audio file length based on the number of skips ahead each of the one or more audio files has and length of the period of time.

2. The method defined in claim 1 further comprising using the packet data network channel for controlling presentation of the one or more accessed audio files.

3. The method defined in claim 1 wherein the text message comprises a menu of selectable options with respect to the one or more accessed audio files.

4. The method defined in claim 1 further comprising controlling presentation of the one or more accessed audio files via the packet data network channel.

5. The method defined in claim 1 further comprising offering a call through an interface to a telephone switch coupled to the storage facility.

6. The method defined in claim 1 wherein the storage facility comprises a voice mail system.

7. The method defined in claim 1 wherein the server is coupled to the storage facility via an interface and a telephone switch.

8. The method defined in claim 1 wherein the text message includes a list of audio files selectable to access the audio file associated with each item in the list.

9. The method defined in claim 1 wherein the text message includes a set of icons representing the one or more audio files, each icon of the set of icons being selectable by a user to receive an audio file associated with said each icon.

10. The method defined in claim 1 further comprising:
    receiving a selection of one or more audio files to be played sent over a packet channel and a network environment;
    offering a call to a recipient at a predetermined number; and
    playing a selected audio file as part of the call.

11. The method defined in claim 10 wherein offering a call is made by the server through a PRI interface to a phone number received by the server with the selection of the one or more audio files to be played.

12. The method defined in claim 10 wherein the call comprises a circuit switched call.

13. The method defined in claim 12 wherein the circuit switched call is a PSTN circuit switch call.

14. The method defined in claim 10 wherein the call comprises a packet switched call.

15. The method defined in claim 14 wherein the packet switched call is a VOP call.

16. The method defined in claim 10 wherein the packet channel comprises the packet data network channel and the network environment comprises the Internet.

17. The method defined in claim 1 further comprising:
    receiving a selection of one or more audio files to be played sent from a user over a packet channel and a network environment; and
    providing audio associated with a user selected one or more audio files via the packet data network channel as packetized voice.

18. The method defined in claim 1 wherein the server accessing the one or more audio files comprises a server providing the storage facility with a user's mail box and identification information.

19. The method defined in claim 18 wherein the identification information comprises a PIN number.

20. The method defined in claim 1 wherein the server accessing the one or more audio files comprises the server generating DTMF tones.

21. The method defined in claim 1 wherein the server accessing the one or more audio files comprises the server using speech generated from a text-to-speech (TTS) portion of the server.

22. The method defined in claim 1 further comprising the server processing speech from the storage facility with using automatic speech recognition (ASR) to determine a number of the one or more audio files stored in the storage facility.

23. The method defined in claim 22 wherein the number of audio files comprises a number of new messages and a number of old messages.

24. The method defined in claim 1 further comprising the server causing the storage facility to play the one or more voice audio files.

25. The method defined in claim 24 wherein the server causing the storage facility to play the one or more audio files comprises generating DTMF tones to cause the storage facility to play the one or more audio files.

26. The method defined in claim 24 wherein the server causing the storage facility to play the one or more audio files comprises generating audio controls to cause the storage facility to play the one or more audio files.

27. The method defined in claim 1 further comprising the server recording the audio files into a storage area within the server.

28. The method defined in claim 1 further comprising the server determining one or more parameters of the one or more audio files retrieved from the storage facility.

29. The method defined in claim 28 wherein one of the one or more parameters comprises audio file length.

30. The method defined in claim 29 further comprising measuring the audio file length as each of the one or more audio files is played.

31. The method defined in claim 28 wherein one of the one or more parameters comprises audio file originator.

32. The method defined in claim 31 further comprising capturing and performing speech recognition on calling number identification information captured by the storage facility and spoken by the storage facility on playback of each of the one or more audio files to the server.

33. The method defined in claim 28 wherein one of the one or more parameters comprises message urgency.

34. The method defined in claim 33 further comprising performing speech recognition on an urgency level spoken by the storage facility.

35. The method defined in claim 28 wherein one of the one or more parameters comprises message arrival time.

36. The method defined in claim 1 further comprising aggregating the one or more audio files with at least one audio file from another storage facility.

37. The method defined in claim 1 further comprising the server dialing a voice mail server in the storage facility.

38. The method defined in claim 1 wherein examining the contents of the storage facility comprises polling the storage facility at intervals.

39. The method defined in claim 1 wherein examining the contents of the storage facility comprises the server detecting the presence of stutter tone.

40. The method defined in claim 1 wherein examining the contents of the storage facility comprises receiving the message waiting indicator from the storage facility.

41. An apparatus comprising:
means for determining to examine contents of audio files in a storage facility;
means for accessing one or more audio files stored in the storage facility; and
means for sending a text message over a packet data network channel, the text message containing information about, the one or more accessed audio files;
means for determining one or more parameters of the one or more audio files retrieved from the storage facility, wherein one of the one or more parameters comprises audio file length; and
means for causing the storage facility to skip ahead a period of time repeatedly while playing at least one of the one or more audio files and determining the audio file length based on the number of skips ahead each of the one or more audio files has and length of the period of time.

42. The apparatus defined in claim 41 further comprising means for using the packet data network channel to control presentation of the one or more accessed audio files.

43. The apparatus defined in claim 41 wherein the text message comprises a menu of selectable options with respect to the one or more accessed audio files.

44. The apparatus defined in claim 41 further comprising means for controlling presentation of the one or more accessed audio files via the packet data network channel.

45. The apparatus defined in claim 41 further comprising means for offering a call through an interface to a telephone switch coupled to the storage facility.

46. The apparatus defined in claim 41 wherein the storage facility comprises a voice mail system.

47. The apparatus defined in claim 41 wherein the server is coupled to the storage facility via an interface and a telephone switch.

48. The apparatus defined in claim 41 wherein the text message includes a list of audio files selectable to access the audio file associated with each item in the list.

49. The apparatus defined in claim 41 wherein the text message includes a set of icons representing the one or more audio files, each icon of the set of icons being selectable by a user to receive an audio file associated with said each icon.

50. The apparatus defined in claim 41 further comprising:
means for receiving a selection of one or more audio files to be played sent over a packet channel and a network environment;
means for offering a call to a user at a predetermined number; and
means for playing a user selected audio file as part of the call.

51. An apparatus comprising:
a server;
a voicemail system coupled to the server via a telephone switch, wherein the server determines contents of audio files in a storage facility, accesses one or more audio files stored in the storage facility, sends a text message over a packet data network channel, the text message containing information about the one or more accessed audio files,
determines one or more parameters of the one or more audio files retrieved from the storage facility, wherein one of the one or more parameters comprises audio file length, and
causes the storage facility to skip ahead a period of time repeatedly while playing at least one of the one or more audio files and determines the audio file length based on the number of skips ahead each of the one or more audio files has and length of the period of time.

* * * * *